United States Patent [19]

Demizu et al.

[11] Patent Number: 5,127,262
[45] Date of Patent: Jul. 7, 1992

[54] MISFIRE DETECTING DEVICE OF AN INTERNAL COMBUSTION ENGINE

[75] Inventors: Akira Demizu; Akihiro Nakagawa; Toshiki Kuroda, all of Himeji, Japan

[73] Assignee: Mitsubishi Denki Kabushiki Kaisha, Tokyo, Japan

[21] Appl. No.: 696,799

[22] Filed: May 7, 1991

[30] Foreign Application Priority Data

Jun. 13, 1990 [JP] Japan ................... 2-154431

[51] Int. Cl.$^5$ ........................................... G01M 15/00
[52] U.S. Cl. ........................................ 73/117.3; 73/115
[58] Field of Search ............... 73/117.3, 115; 123/425, 123/435

[56] References Cited

U.S. PATENT DOCUMENTS

| | | | |
|---|---|---|---|
| 4,403,505 | 9/1983 | Hattori et al. ................... | 73/115 X |
| 4,567,755 | 2/1986 | Ootsuka et al. ................... | 73/117.3 |
| 5,056,487 | 10/1991 | Yamakado et al. ............... | 123/435 X |

FOREIGN PATENT DOCUMENTS

62-30932 2/1987 Japan .

Primary Examiner—Jerry W. Myracle
Attorney, Agent, or Firm—Sughrue, Mion, Zinn, Macpeak and Seas

[57] ABSTRACT

A misfire detecting device of an internal combustion engine comprises a pressure detector(s) for detecting an inner cylinder pressure of the engine, a crank angle detector for detecting a crank angle, and a misfire detector for detecting a misfire based on signals from the pressure detector and the crank angle detector. The misfire detector judges that the engine is under a misfire, when a comparison is made between a first integrated value of an indicated inner cylinder pressure before a predetermined crank angle of a combustion cycle of the engine and a second integrated value of the indicated inner cylinder pressure after the predetermined crank angle, and when there is a difference between the first value and the second value by less than a predetermined value.

2 Claims, 7 Drawing Sheets

FIGURE 3B  Cylinder identification

FIGURE 3C  Crank angle

FIGURE 3D  A/D conversion

S; Suction  C; Compression  Ex; Explosion  E; Exhaust

MISFIRE DETECTING DEVICE OF AN INTERNAL COMBUSTION ENGINE

BACKGROUND OF THE INVENTION

1. Field of the Invention

The present invention relates to a misfire detecting device of an internal combustion engine capable of detecting a misfire of an internal combustion engine utilized in an automobile or the like.

2. Discussion of Background

A misfire detecting device is disclosed in Japanese Unexamined Patent Publication No. 30932/1987. This device detects an inner cylinder pressure by an inner cylinder pressure sensor, at two points before and after a top dead center in compression of an engine which are apart from the top dead center by the same angular distance. When both pressures are almost equal, a judgment is made as a misfire of the engine.

However, the conventional device erroneously detects a misfire, when a pressure variation takes place due to a change of a combustion state, or when a noise is superposed on the inner cylinder pressure detection value.

SUMMARY OF THE INVENTION

It is an object of the present invention to provide a misfire detecting device of an internal combustion engine which does not erroneously detect a misfire when the pressure variation due to a change of a combustion state takes place, or when a noise is superposed on the inner cylinder pressure detection value.

According to the present invention, there is provided a misfire detecting device of an internal combustion engine which comprises:

pressure detecting means for detecting an inner cylinder pressure of the engine;

crank angle detecting means for detecting a crank angle; and misfire detecting means for detecting a misfire based on signals from the pressure detecting means and the crank angle detecting means;

said misfire detecting means judging that the engine is under a misfire, when a comparison is made between a first integrated value of an indicated inner cylinder pressure before a predetermined crank angle of a combustion cycle of the engine and a second integrated value of the indicated inner cylinder pressure after the predetermined crank angle, and when there is a difference between the first value and the second value by less than a predetermined value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
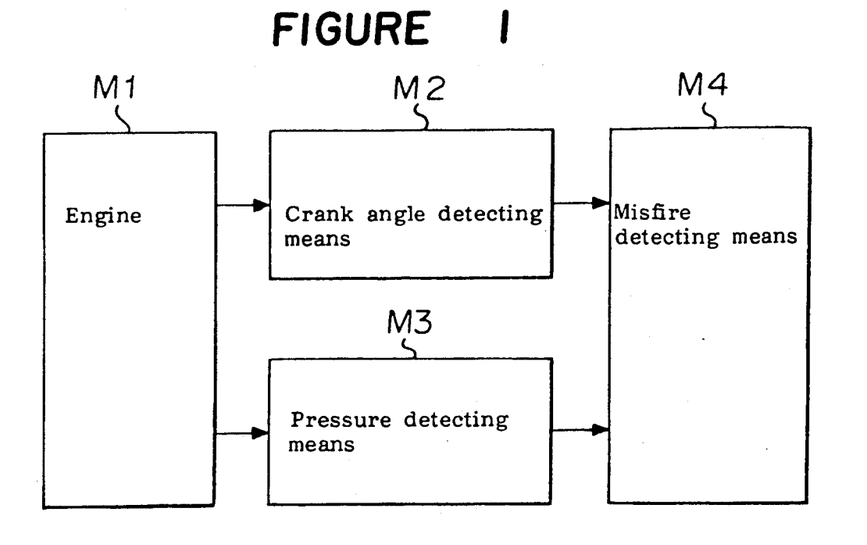
FIG. 1 is a block diagram showing the structure of the invention.

FIG. 1 is a block diagram showing the basic structure of the invention. In FIG. 1, M1 is an engine, M2 is a crank angle detecting means which detects the crank angle of the engine, which outputs pulses at every reference position of the crank angle, and at every unit angle of the crank angle. M3 is a pressure detecting means which detects an inner cylinder pressure. M4 is a misfire detecting means, which measures a pressure by a pressure detecting means M3 at a predetermined crank position which is given by the crank angle detecting means M2, and carrys out a misfire determination according to a predetermined procedure.

Figure 2:
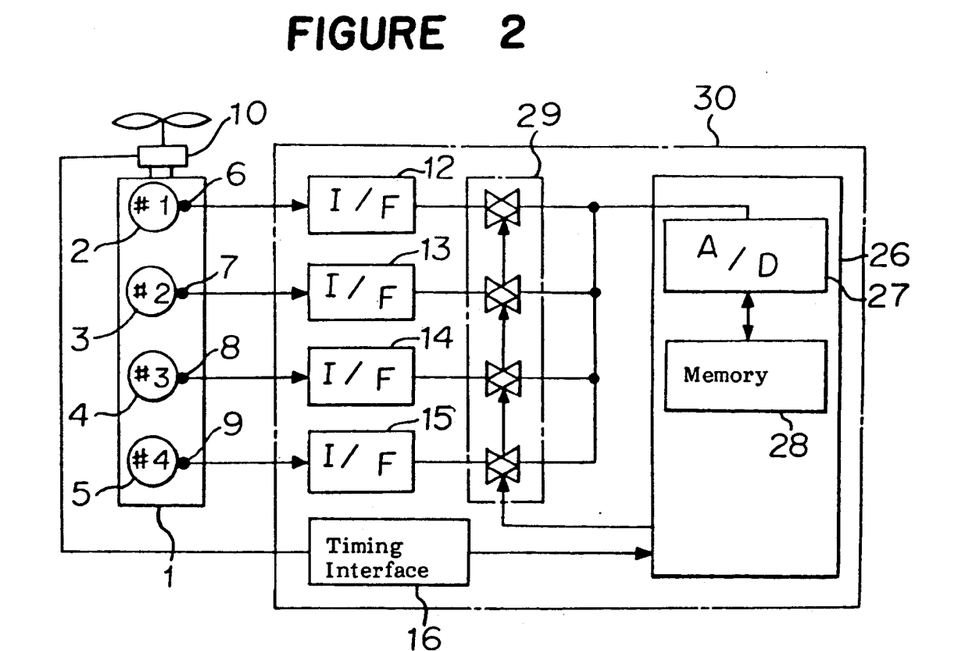
FIG. 2 is a block diagram showing a device to which the invention is applied.

FIG. 2 shows an embodiment of the invention. A numeral 1 signifies an engine having #1 to #4 cylinders 2 to 5, numerals 6 to 9, pressure sensors which detect the inner cylinder pressures of the cylinders 2 to 5. As the pressure sensor, a piezoelastic element which generates an electric charge corresponding to the change of the inner cylinder pressure, or a semiconductor pressure sensor which detects the inner cylinder pressure as a change of a resistance value, by introducing the pressure to a semiconductor diaphragm, is utilized. The part 10 is a crank angle sensor which is connected to a crank shaft of the engine 1, generates a reference position pulse at every crank angle reference position (every 180 degree to 720 degree), and generates a unit angle pulse at every unit angle (for instance every 1 degree), and determines the timing of the pressure detection. The part 30 is an inner cylinder pressure measuring unit which receives outputs from the pressure sensors 6 to 9 and the crank angle sensor 10. The inner cylinder pressure measuring unit 30 is composed of the interfaces (I/F) 12 to 15 which convert the outputs of the pressure sensors 6 to 9 into voltage values, the timing interface 16 which receives the output of the crank angle sensor 10, the single chip microcomputer 26 (hereinafter, microcomputer) having the A/D converter 27 and the memory 28, and the multiplexer 29 which selects and switches the outputs of the interfaces 12 to 15 according to the control order of the microcomputer and transmits the output to the A/D converter.

Figure 3A:
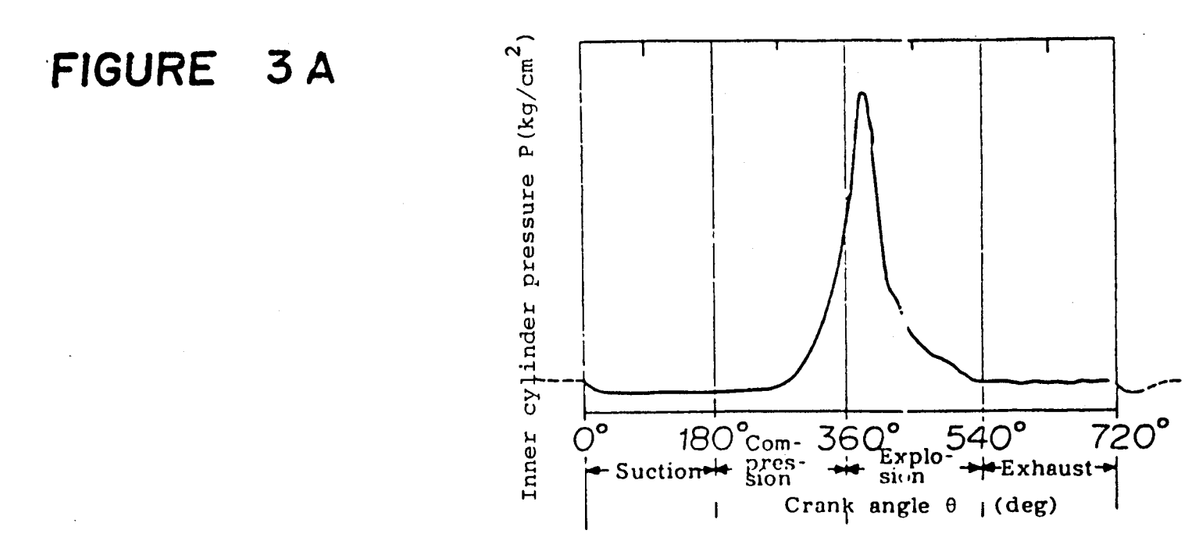
FIGS. 3A, 3B, 3C, and 3D are diagrams showing the relationship among an inner cylinder pressure change, a cylinder identifying signal and a crank angle signal.
Figure 3B:
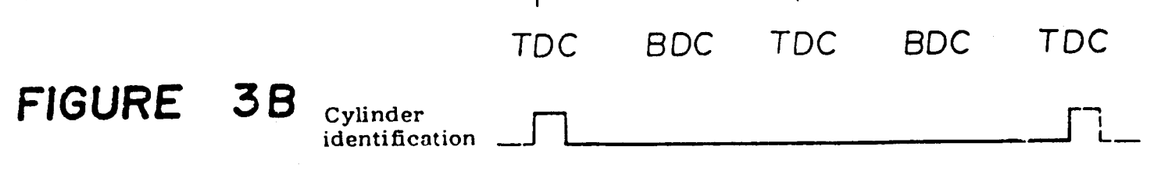
Figure 3C:
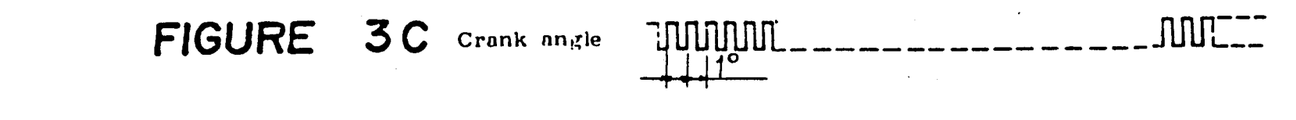
Figure 3D:
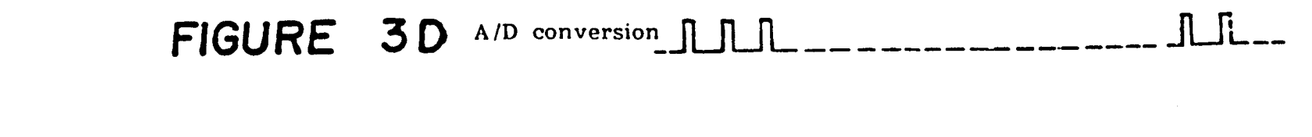
Figures 4A, 4B:
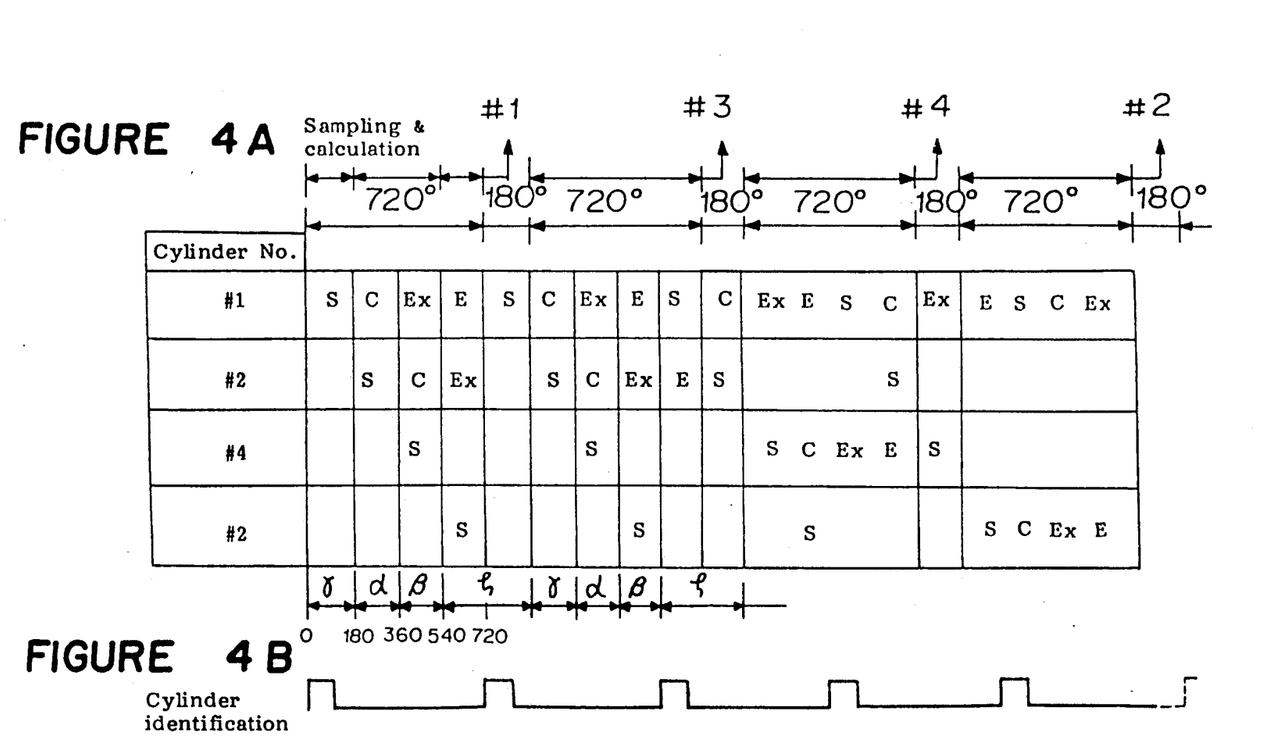
FIGS. 4A, 4B and 4C are diagrams showing the relationship among strokes of an engine, the cylinder identifying signal and the crank angle.
Figure 4C:
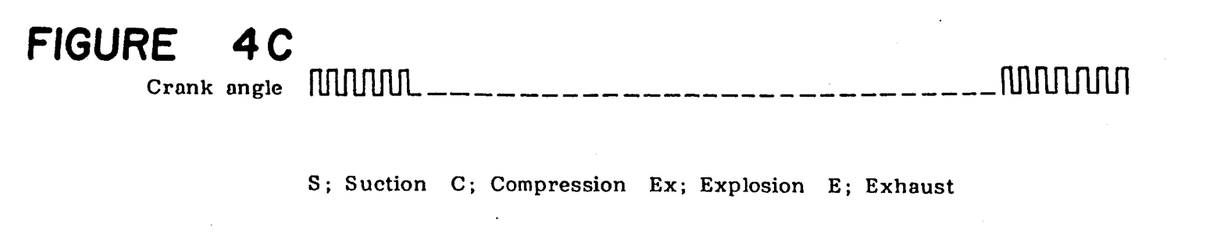

In the above device, the output from pressure sensors 6 to 9 is supplied to the multiplexer 29 from the interfaces 12 to 15, in which the signals are selected and inputted to the microcomputer 26. FIGS. 3A to 3D show the pressure change of the cylinders 2 to 5 with respect to the crank angle of a 4 stroke engine and the wave pattern, wherein TDC is a top dead center of the engine 1, and BDC is a bottom dead center of the engine 1. As shown in FIGS. 3B and 3C, the crank angle sensor can output cylinder identifying signals at an interval of 720 degrees, as well as a crank angle signal at every one degree, which are supplied to the microcomputer 26 through the interface 16. The pressure signal selected by the multiplexer 29 in correspondence with the above signals, is converted from analogue to digital value for instance at an interval of 2 degrees of the predetermined crank angle by the A/D converter 27, and memorized in the memory 28. This sequence is repeated at the interval of 720 degrees, which is shown in FIG. 4A. First of all, the input data of #1 cylinder 2 is converted from analogue to digital value during one combustion cycle from suction to exhaust, and data treatment is carried out during the successive intervals of 180 degrees in crank angle. In the same way as above, the A/D transformation and the data treatment are carried out at the interval of 720 degrees in the order of #3 cylinder 4, #4 cylinder 5, and #2 cylinder 3. Accordingly, the gathering the data of the cylinders 2 to 5 is carried out intermittently and successively at the rate of 1 time for each cylinders per 4 times. When the number of cylinder is "n", the measuring period for each cylinder is 1 per n. The crank angle interval for the timing for next step is 720/n. FIGS. 4B and 4C show the output of the crank angle sensor 10.

Figure 5:
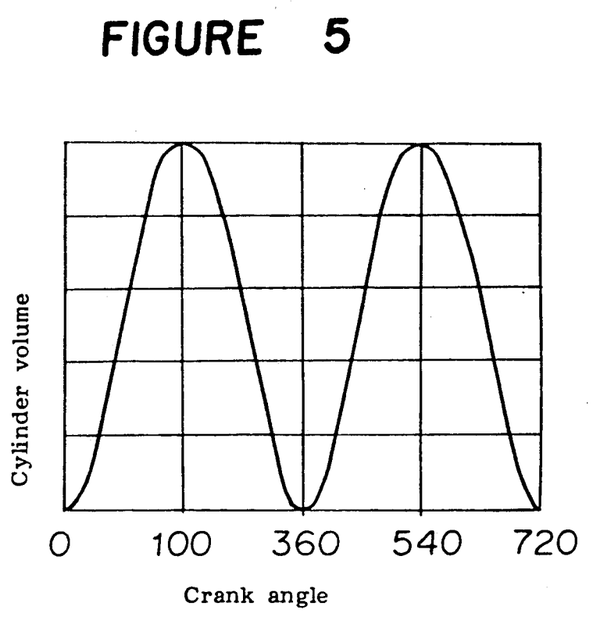
FIG. 5 is a diagram showing the relationship between the crank angle and a cylinder volume.
Figure 6:
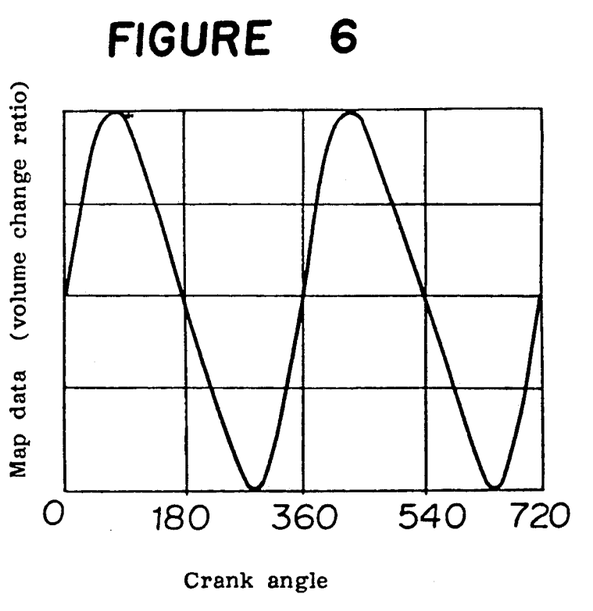
FIG. 6 is a diagram showing the relationship between the crank angle and the volume change ratio.

Next, explanation will be given to an actual method of the misfire detection. First of all, the indicated work which the engine 1 carries out in 1 combustion cycle, $W_i$ is, $W_i = \int p \times dv$ (kg×cm), where p is the inner cylinder pressure (kg/cm$^2$), and v is the cylinder volume (cm$^3$). The actual calculation program is performed by the following equation (1).

$$W_i = \sum_{CA=1}^{720} [P_{AD} \times M_{CA}] \quad (1)$$

where CA is the crank angle, $P_{AD}$ is the A/D conversion value at each generation of the crank angle signal (every 1 degree), and $M_{CA}$ is read from a map, which is a value corresponding to dv that is related to the crank angle $\theta$. FIG. 5 shows the volume change corresponding to the crank angle. From FIG. 5, the relationship between the crank angle and the volume change ratio which is shown in FIG. 6, is obtained. The relationship in FIG. 6 is memorized beforehand by the memory of the microcomputer 26 as map data. This map data is read out in correspondence to the crank angle.

Figure 7:
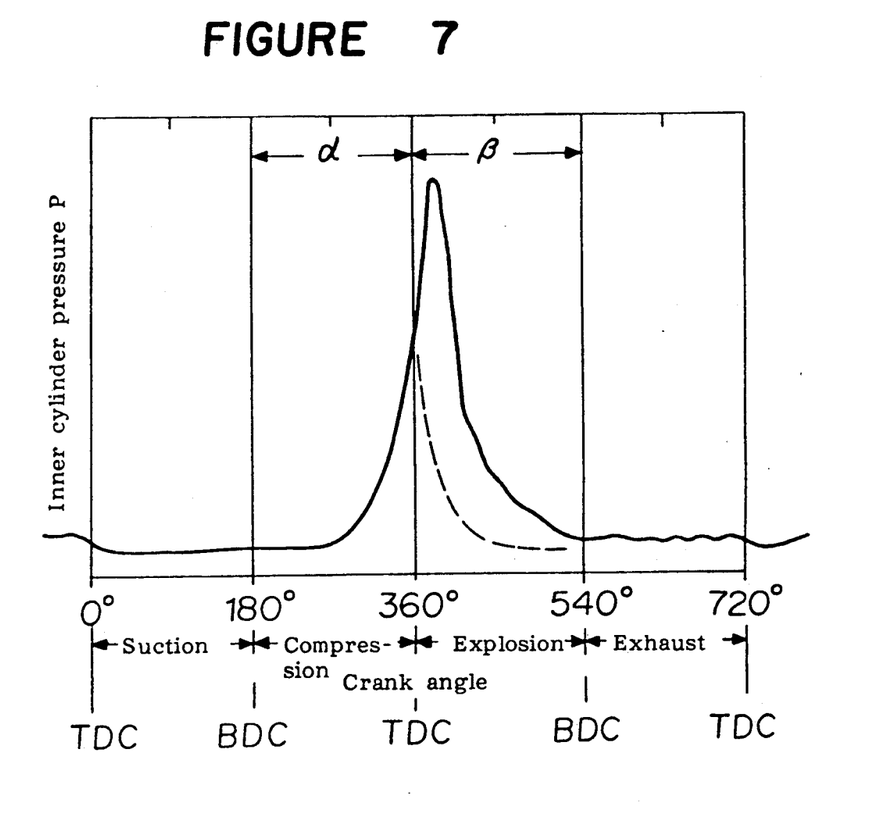
FIG. 7 is a diagram showing the relationship between the crank angle and a change of the inner cylinder pressure.

The relationship between the indicated work $W_i$ and the misfire is t be explained using FIG. 7. In FIG. 7, the bold line shows the normal combustion. In the normal combustion of the engine, the mixture which is charged into the cylinder in suction stroke, is pressurized in compression stroke, is ignited at a point near to TDC in compression stroke, is rapidly expanded in explosion stroke, and is discharged outside of the cylinder in exhaust stroke. Next the case of a misfire is shown in dotted line in the same Figure. In case of an ignition failure, or in case that the mixture ratio of air to fuel is incombustible, the pressure change in the explosion stroke, as shown in the dotted line, in the ranges $\alpha$ and $\beta$, is symmetrical with respect to the vertical line of 360 degree in crank angle. The dotted line shows the case in which no combustion takes place, or the case of a complete misfire. When the degree of the misfire is light, the pressure change falls in the range between the bold line and the dotted line in the range of $\beta$.

This invention notices this phenomena. The indicated work of $W_{i\alpha}$ in a predetermined range (for instance $\alpha$) before a predetermined crank angle T (for instance 360 degree), is calculated by the following equation (2).

$$W_{i\alpha} = \sum_{CA=181}^{360} [P_{AD} \times M_{CA}] \quad (2)$$

Similarly, the indicated work $W_{i\beta}$ in a predetermined range (for instance $\beta$) after the predetermined crank angle T, is calculated according to the equation (3).

$$W_{i\beta} = \sum_{CA=361}^{540} [P_{AD} \times M_{CA}] \quad (3)$$

By comparing these values, the judgment is made in which the engine is normal when the following equation (4) is established, and in which the engine is under misfire when the equation (4) is not established.

$$l \times W_{i\alpha} + k \geq W_{i\beta} \quad (4)$$

where l is a gain constant and k is an offset constant, which are utilized for broadening the criteria value of the equation (4). In case that $\cdot = 1$ and $k = 1$, the device can detect the level of a complete misfire state. The gain constant · and the offset constant k are determined corresponding to the level of the misfire to be detected.

Figure 8:
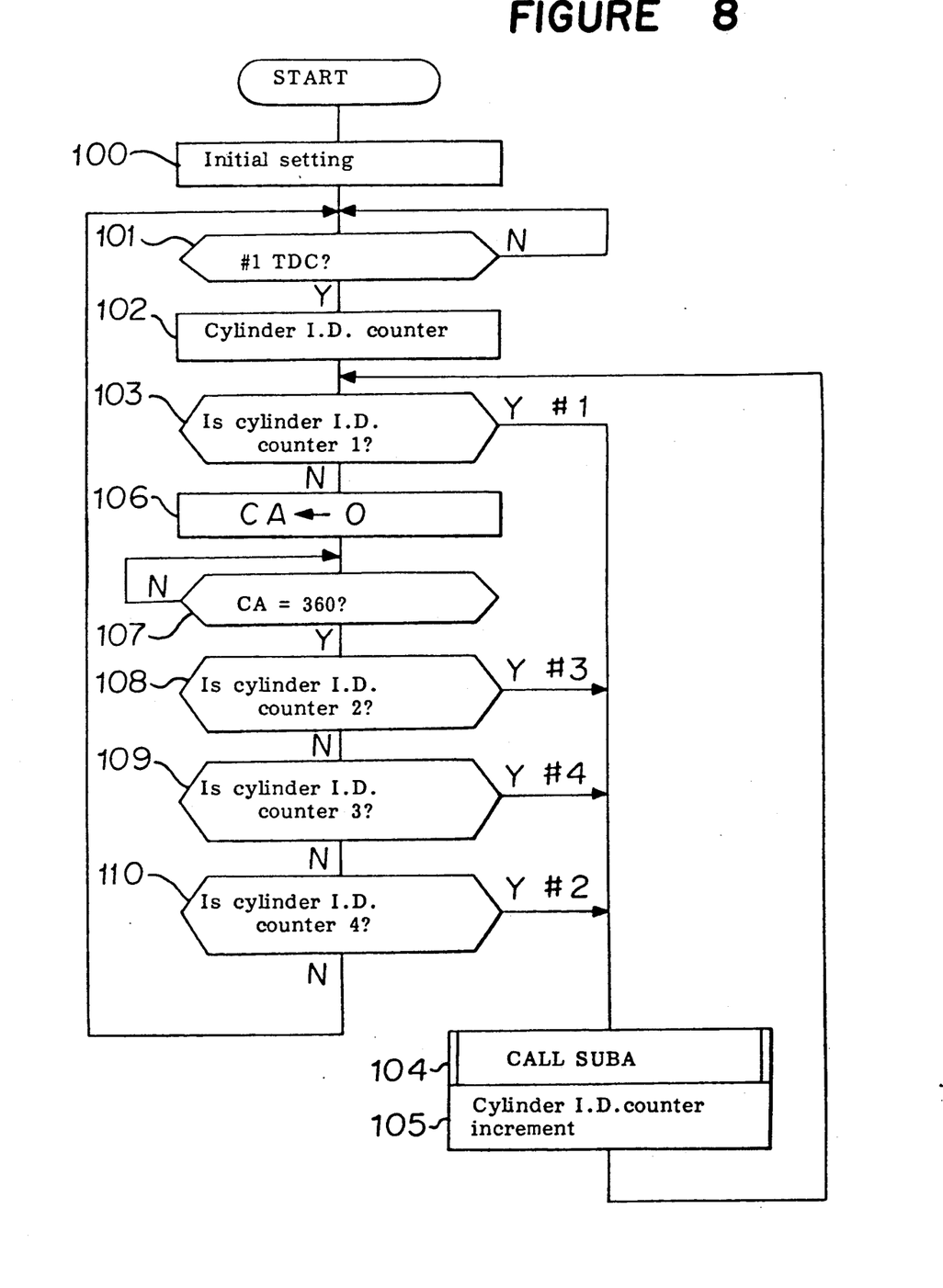
FIG. 8 is a flow chart showing an operation for cylinder identification.
Figure 9:
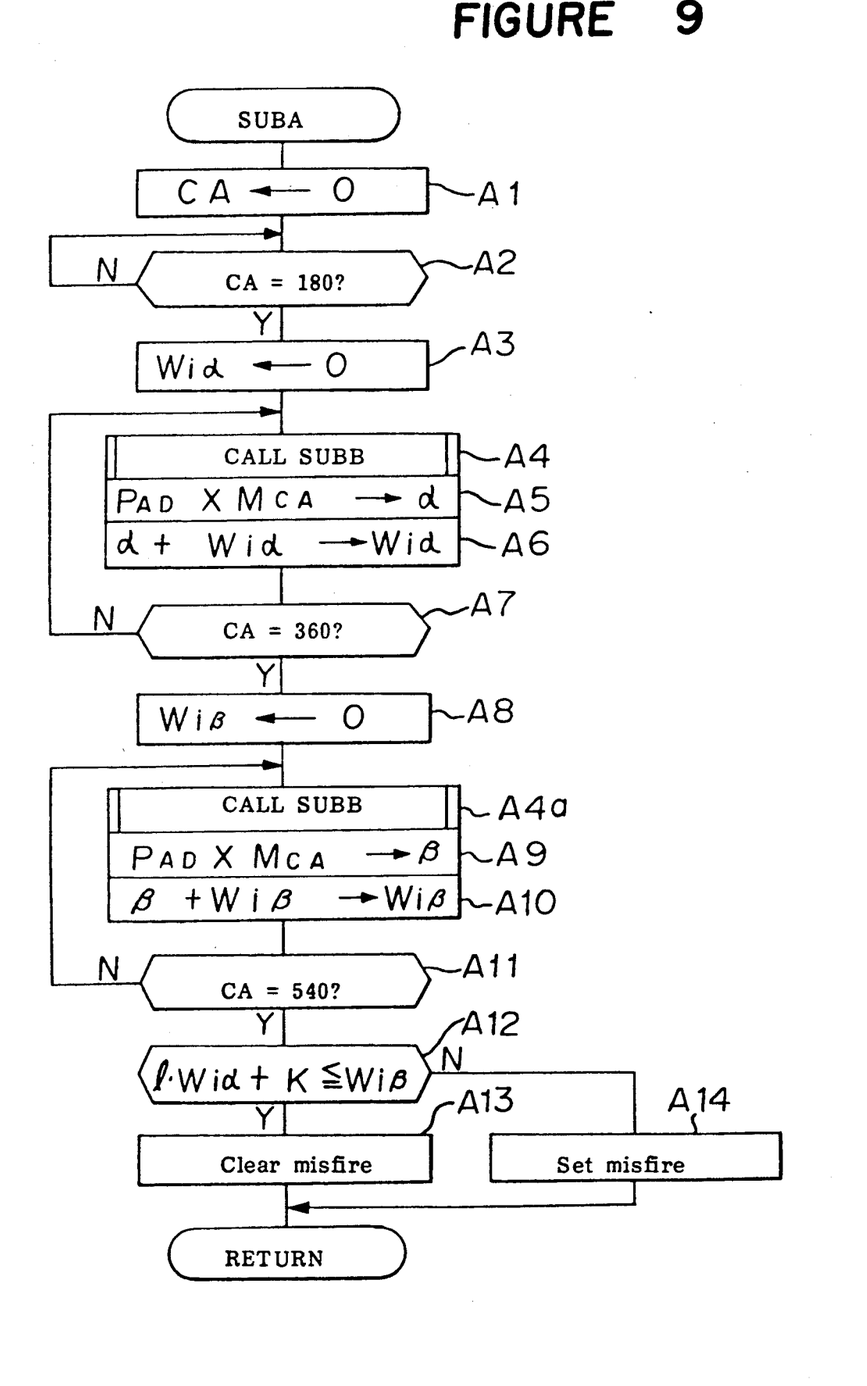
FIG. 9 is a flow chart showing an operation for calculation of an indicated work ratio.
Figure 10:
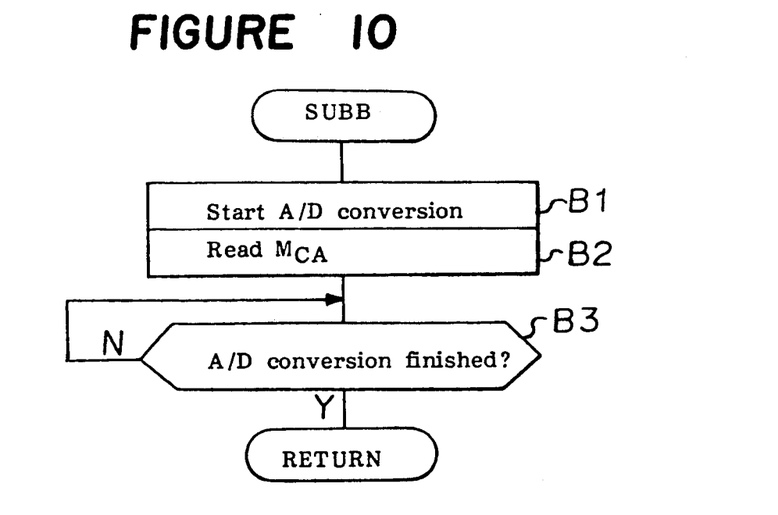
FIG. 10 is a flow chart showing an operation of A/D conversion.

FIGS. 8 to 10 are flow charts which detect the misfire of each cylinder. FIG. 8 is a main routine, which is carried out after the start up of the program. The angle signal of the crank angle sensor 10 is transmitted to the microcomputer 26 through the interface 16, and is given to the microcomputer during the carrying out of the main routine as an interruption signal. By this interruption signal, the setting of the cylinder identifying signal and the counting out by the crank pulse counter CA, mentioned later, in synchronization with the rise of the cylinder identifying signal shown in FIG. 3B, and the rise of the crank angle signal shown in FIG. 3C, are carried out. When this treatment is finished, the original main routine is carried out again.

Step 100 of FIG. 8 is for initializing in starting up of the measurement, wherein the memory which memorizes the misfire is cleared, and the memory, mentioned later, is set to an initial condition. Next, in Step 101, the rise of the cylinder identifying signal of the crank angle sensor 10 shown in FIG. 3B, is awaited.

When the cylinder identifying signal has risen, the operation goes to Step 102. In Step 102, the cylinder identifying counter installed in the memory 28 is set to 1. Next, in Step 103, judgment is made on the value of the counter. In this case the counter is set to 1 in Step 102, and the operation goes to Step 104.

Step 104 is a subroutine called by the main routine of FIG. 8. The procedure of the subroutine is shown in FIG. 9. First of all, in Step A1, the crank pulse counter CA installed in the memory 28 is cleared to zero. The cylinder corresponding to the value of the cylinder identifying counter is connected to the A/D converter 27 by the multiplexer 29. Next, in Step A2, during the range $\gamma$ shown in FIG. 4A, the operation waits until CA = 180. When this condition is satisfied, the operation goes to Step A3. In Steps A3 to A7, the indicated work $W_{i\alpha}$ in the range of $\alpha$ shown in FIG. 7, is measured.

First of all, in Step A3, the memory for measuring $W_i$ is cleared to 0. The operation goes to Step A4. Step A4 is a further subroutine called by the subroutine in FIG. 9. This subroutine carries out A/D conversion of the cylinder pressure according to the procedure as shown in FIG. 10. This routine is initialized by an interruption at every predetermined crank angle, and carrys out A/D conversion once per every predetermined crank angle. First of all, in Step B1, the A/D converter 27 is started. Next, in Step B2, the volume change ratio of each cylinder shown in FIG. 6, is read corresponding to the crank angle, and is set to the memory $M_{CA}$. Next the operation goes to Step B3, and waits until the A/D conversion is finished. When the A/D conversion is finished, the value of A/D conversion is set to the memory $P_{AD}$, and the operation returns to the subroutine in FIG. 9.

In the subroutine of FIG. 9, the operation goes to Step A5, in which the multiplication of $P_{AD} \times M_{CA}$ is carried out, and the result is again stored in the memory as $\alpha$. Next, the operation goes to Step A6, in which the addition of $\alpha + W_{i\alpha}$ is carried out, and the result of the calculation is reset to $W_{i\alpha}$. Next, in Step A7, the judgment is made on whether CA=360, and the above mentioned loop is repeated from 181 degree to 360 degree in crank angle. $W_{i\alpha}$ is added at each crank angle, the operation carrys out the treatment corresponding to equation (2), and finally the indicated work $W_{i\alpha}$ in the range of $\alpha$ is measured and calculated.

Next, the operation goes to Step A8. In Steps A8 to A11, the indicated work $W_{i\beta}$ in the range of $\beta$, is measured. In Step A8, the memory for measuring $W_{i\beta}$ is cleared to 0. Next the operation goes to Step A4a, and the above mentioned treatment in FIG. 10 is carried out. For the operation in Step A4a, the explanation is omitted, since the operation in Step A4a is the same with that of the above mentioned Step A4. The operation goes to Step A9, wherein $P_{AD} \times M_{CA}$ is carried out, and the result is stored in the memory $\beta$. In Step A10, the addition of $\beta + W_{i\beta}$ is carried out, and the result of the calculation is reset to $W_{i\beta}$.

Next, in Step A11, a judgment is made on whether CA=540, and the loop from Step A4 to Step A11, is repeated from 361 degree to 540 degree in crank angle, and the operation is carried out for the treatment corresponding to equation (3), and finally the indicated work $W_{i\beta}$ in the range $\beta$ is measured and calculated. Next the operation goes to Step A12, in which the values of $W_{i\alpha}$ and $W_{i\beta}$ are compared based on equation (4). If the judgment is a misfire, the operation goes to Step A14, in which a misfire flag installed in the memory 28, is set. If the judgment is not a misfire, the operation goes to Step A13, in which the misfire flag is cleared. After the judgment on the misfire on the cylinder #1 is carried out as mentioned above, the operation returns to Step 105 of the main routine in FIG. 8. In Step 105, 1 is added to the above mentioned cylinder identifying counter, and the operation goes back to Step 103. In Step 103 the value of the counter is judged again. However, the value is incremented in Step 105, the operation goes to Step 106.

In Step 106, the crank pulse counter CA is cleared to zero, and the operation goes to Step 107. In Step 107, the operation waits during the 360 degree range of $\zeta$ shown in FIG. 4. When this is finished, the operation goes to Step 108, in which the cylinder identifying counter is judged. In this case in Step 105 the counter is set to 2, and again the operation goes to Step 104. In Step 104, the judgment of the misfire of the third cylinder #3 is carried out by the above mentioned procedure. After Step 104 is finished, the operation goes to Step 105, in which the cylinder identifying counter is again incremented, and the counter is set to 3. Steps 103 to 109 are carried out, and the misfire of the fourth cylinder is judged. The judgment of the misfire of second cylinder #2 is carried out in the same way in the order of the range $\gamma$, $\alpha$, $\beta$ and $\zeta$. When the judgment of the second cylinder is finished, the operation returns to Step 101 again, and the misfire judgment is again repeated according to the order of firing; #1, #3, #4 and #2. In this embodiment, the misfire flag is set and reset. However, a misfire flag corresponding to each cylinder in the memory 28, may be provided, and the result of the judgment may be memorized independently. The set values of the range ($\alpha$, $\beta$) for obtaining the indicated work, and of the predetermined crank angle T may be changed according to the ignition timing of the engine or to the running condition of the engine. Moreover in this embodiment the indicated work $W_i$ is utilized, however it may be substituted by the integrated pressure value at every crank angle. The indicated work $W_i$ may be substituted by the indicated mean effective pressure $P_i$ obtained from the indicated work $W_1$ divided by the stroke volume Vh (cm³) by using the following equation (5), with the same result.

$$P_i = W_i/Vh \ (\text{kg/cm}^2) \tag{5}$$

In this embodiment, the pressure of a plurality of the cylinders are measured intermittently and successively by using one A/D converter through a plurality of multiplexers, so that a misfire is detected. However, a plurality of A/D converters for the respective cylinders may be installed, and misfires of multi-cylinders may be measured with the same result.

As explained above, in this invention the integrated values of the sensed cylinder pressures both before and after a predetermined crank angle by a certain degree, are compared. When both values have a difference of less than a predetermined value, a judgment is made as a misfire. Therefore this invention does not cause an erroneous operation, even when a pressure variation is generated by a combustion state of the engine, or when noises are superposed on the detected value of the inner cylinder pressure.

Obviously, numerous modifications and variations of the present invention are possible in light of the above teachings. It is therefore to be understood that within the scope of the appended claims, the invention may be practiced otherwise than as specifically described herein.

What is claimed is:

1. A misfire detecting device for an internal combustion engine, comprising:
    a) pressure detecting means for detecting an inner cylinder pressure of the engine;
    b) crank angle detecting means for detecting a crank angle; and
    c) misfire detecting means for detecting a misfire based on signals from the pressure detecting means and the crank angle detecting means;
    d) said misfire detecting means comprising:
        1) means for generating a first integrated value of the detected inner cylinder pressure extending over a predetermined angular range before a predetermined crank angle during a compression cycle of the engine,
        2) means for generating a second integrated value of the detected inner cylinder pressure extending over said predetermined angular range after said predetermined crank angle during a combustion cycle of the engine, and 3) means for comparing the first and the second integrated values and for judging that the engine is misfiring when there is a difference between the first and the second integrated values of less than a predetermined amount.

2. The misfire detecting device for an internal combustion engine according to claim 1, wherein the predetermined crank angle is a top dead center between compression and combustion cycles.

* * * * *